United States Patent
Rolff

(10) Patent No.: US 8,850,866 B2
(45) Date of Patent: Oct. 7, 2014

(54) METHOD FOR FUNCTIONALLY TESTING A LEAK DETECTOR

(75) Inventor: Randolf Rolff, Kerpen-Horrem (DE)

(73) Assignee: Inficon GmbH, Cologne (DE)

( * ) Notice: Subject to any disclaimer, the term of this patent is extended or adjusted under 35 U.S.C. 154(b) by 477 days.

(21) Appl. No.: 13/201,604

(22) PCT Filed: Feb. 10, 2010

(86) PCT No.: PCT/EP2010/051652
§ 371 (c)(1),
(2), (4) Date: Sep. 22, 2011

(87) PCT Pub. No.: WO2010/094608
PCT Pub. Date: Aug. 26, 2010

(65) Prior Publication Data
US 2012/0031162 A1    Feb. 9, 2012

(30) Foreign Application Priority Data

Feb. 18, 2009   (DE) .......................... 10 2009 009 370

(51) Int. Cl.
*G01L 27/02* (2006.01)
*G01L 21/30* (2006.01)
*G01M 3/20* (2006.01)
*G01L 27/00* (2006.01)

(52) U.S. Cl.
CPC .............. *G01L 21/30* (2013.01); *G01M 3/207* (2013.01); *G01L 27/005* (2013.01)
USPC ............................................ 73/1.58; 73/49.8

(58) Field of Classification Search
USPC .................... 73/1.17, 1.58, 40–49.8
See application file for complete search history.

(56) References Cited

U.S. PATENT DOCUMENTS

| | | | |
|---|---|---|---|
| 3,436,955 A | 4/1969 | Wilcher | |
| 4,269,058 A | 5/1981 | Richman | |
| 4,384,470 A | 5/1983 | Fiore | |
| 5,661,229 A | 8/1997 | Bohm et al. | |
| 7,266,991 B2* | 9/2007 | Bley | 73/31.05 |
| 8,171,773 B2* | 5/2012 | Wetzig et al. | 73/23.42 |
| 8,725,435 B2* | 5/2014 | Snow et al. | 702/51 |
| 2007/0235083 A1* | 10/2007 | Dlugos | 137/223 |
| 2008/0202210 A1 | 8/2008 | Liepert | |
| 2009/0173136 A1* | 7/2009 | Brockmann | 73/1.58 |
| 2010/0005861 A1 | 1/2010 | Wetzig et al. | |

FOREIGN PATENT DOCUMENTS

| | | |
|---|---|---|
| DE | 29 26 112 A1 | 1/1981 |
| DE | 10 2006 016 747 A1 | 10/2007 |
| GB | 619133 | 3/1949 |

* cited by examiner

*Primary Examiner* — David A Rogers
(74) *Attorney, Agent, or Firm* — Craig Metcalf; Kirton McConkie

(57) ABSTRACT

In order to functionally test a leak detector (20) that comprises a partial pressure sensor (21), a testing device (30) having a variable volume (33) is connected to the leak detector. Said testing device can be a syringe. By changing the volume (33), the partial pressure of the test gas contained in the ambient air is changed. A test is carried out to check whether the leak detector (20) indicates the change. According to the invention, a vacuum pumping device having mechanical vacuum pumps is not required. The method is suitable for testing vacuum systems that contain a vacuum pumping device that is used in the leak test to generate a required vacuum. The service technician can perform the functional test of the leak detector (20) separately from the system and the vacuum pumping device.

7 Claims, 1 Drawing Sheet

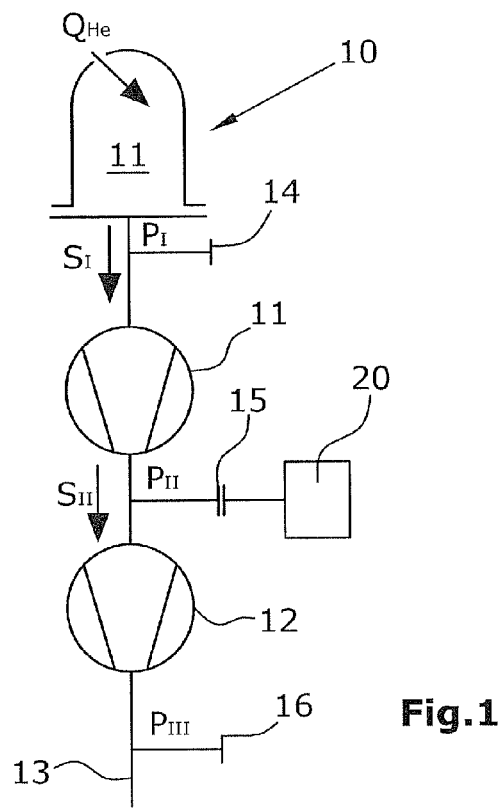
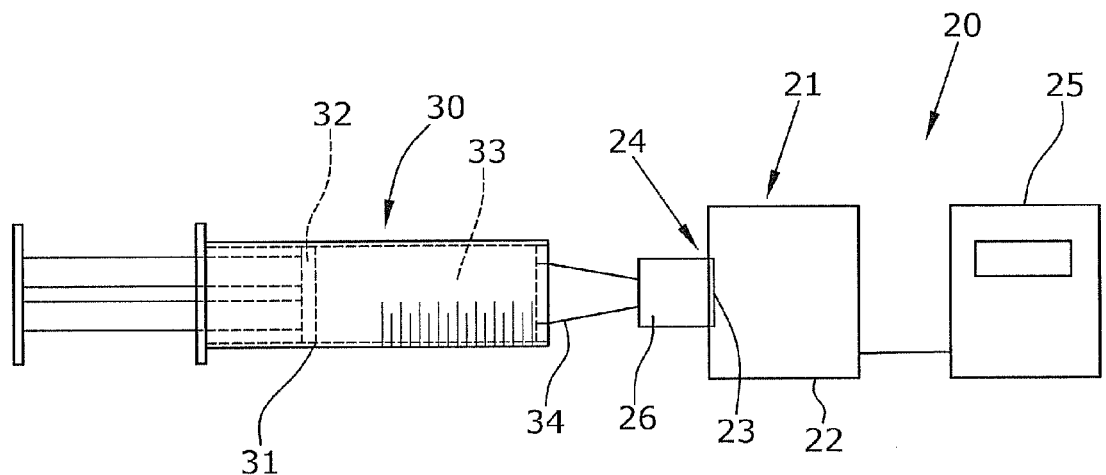
Fig.1
Fig.2

METHOD FOR FUNCTIONALLY TESTING A LEAK DETECTOR

This application is a National Stage of International Application No. PCT/EP2010/051652, filed Feb. 10, 2010, and entitled METHOD FOR FUNCTIONALLY TESTING A LEAK DETECTOR, which claims the benefit of DE 10 2009 009 370.2, filed Feb. 18, 2009. This application claims priority to and incorporates herein by reference the above-referenced applications in their entirety.

The invention relates to a method for the functional testing of a leak detector which includes a partial pressure sensor having a gas inlet.

Leak detectors serve for detecting the presence of a test gas in a gas flow. Said gas flow will normally be generated by suction of gas from a vessel; however, also a flow generated solely by diffusion can be used. When a test gas, normally helium, is being sprayed from the outside against the vessel, a possibly existing leak will cause an intrusion of test gas into the interior of the vessel, so that the test gas will be detectable in the gas sucked from the vessel. A further method provides that the test gas is introduced into the vessel which is to be tested for leak-tightness. On the outer side of the vessel, suction will be applied by means of a sniffing-type leak detector so as to detect test gas issuing from the vessel.

If a leak detection is to be performed in a vacuum system of the type including a vessel that is to be evacuated and a vacuum pump device, a leak detector will be connected to the suction line of the vacuum pump device. While complex leak detectors for test gas detection comprise a mass spectrometer, also partial pressure sensors are known, which require less technical expenditure and are relatively light-weighted. Such a partial pressure sensor designed for use of helium or hydrogen as a test gas is described in WO 2002 003057 (Inficon). Said sensor includes a window provided with a membrane selectively permeable e.g. to helium and delimiting a sensor chamber, and further includes a pressure sensor in the interior of the sensor chamber. The sensor is operative at random ambient pressures.

A further example of a partial pressure sensor is described in DE 10 2006 047 856 A1 (Inficon). Partial pressure sensors of this type are known under the trade name Wise Technology™.

It is an object of the invention to provide a method for the functional testing of a leak detector wherein the functional test can be performed without a conveying pump.

The method according to the present invention is distinguished by the features defined in claim 1. Said method is characterized in that a testing device, comprising a chamber with variable volume, will be connected to the leak detector, that, by changing the size of said chamber, the partial pressure of the test gas contained in the ambient air is changed at the inlet of the partial pressure sensor, and that it is checked whether the leak detector indicates the change.

The method for functional testing according to the invention obviates the use of machine-driven vacuum pumps and instead makes use of a testing device comprising a chamber with variable volume. Such a testing device can be conveniently transported and connected to the leak detector. Preferably, the device is operable manually, thus obviating also the need for motors or other drives.

The method is particularly suited for helium leak detectors to be used in vacuum systems comprising a vessel and a vacuum pump device. The leak detector will be connected to the suction line at a suitable site. The leak detector does not require a pump of its own because the suction flow is generated by the vacuum pump device of the system. Such a miniaturized leak detector is especially suited for service purposes because, due the absence of integrated pumps, it is easily transported. Before carrying out a servicing task, the service technician will wish to verify the functionality of the leak detector, possibly even inclusive of a verification of its sensitivity. In this manner, the technician can avoid going on a service call with a defective device, or connecting a defective device to the system. Since the leak detector has no built-in pump, the functional testing is performed by use of a small-sized and light-weighted testing device.

The invention exploits the effect that a test gas, such as e.g. helium or hydrogen, is contained in the ambient air and that the content of the test gas in the air is relatively constant. By enlarging the chamber of the testing device, the pressure acting on the inlet of the sensor can be reduced whereby also the partial pressure of the test gas will be lowered in correspondence thereto. Thus, functional testing of the leak detector is rendered possible by examining whether the leak detector will indicate the change of the partial pressure. Also calibration of the leak detector is possible by setting the measured change of the partial pressure in relation to the helium content existing in the ambient air.

The testing device preferably consists of a syringe of a type similar to those used for administering medical liquids. Such a syringe comprises a syringe barrel and a piston arranged for movement therein, said piston being connected to a piston rod. By retracting the piston, the chamber in the interior of the piston will be enlarged. At the front end of the syringe barrel, a syringe cone is arranged. The syringe cone can be connected in a pressure-tight manner to an adapter mounted to the inlet of the partial pressure sensor.

The invention makes it possible for the service technician to perform the functional testing and calibrating of the leak detector easily without excessive involvement of devices and at any desired location. All that has to be carried along will be a mere hand-operated testing device. Instead of realizing the testing device as a syringe, the device can be a piston-cylinder unit or another chamber with variable volume.

An exemplary embodiment of the invention will be described in greater detail hereunder with reference to the drawings.

IN THE DRAWINGS

FIG. 1 illustrates the use of a partial pressure sensor in a system consisting of a pressure-tight vessel and a vacuum pump device, and FIG. 2 is a schematic representation depicting the use of a testing device applied to a partial pressure sensor operable according to FIG. 1.

In FIG. 1, a vacuum system is shown which comprises a vessel 10 whose internal chamber shall be evacuated. Vessel 10 can be a reactor for vacuum treatment of workpieces, e.g. for sputtering, vapor-depositing, CVD and the like.

The vacuum test involves detecting whether a test gas— herein: helium—is leaking from outside into the evacuated vessel 10. The leak rate of helium is designated by $Q_{He}$.

Vessel 10 is connected to a vacuum pump 11, e.g. a Roots pump. The outlet of vacuum pump 11 is connected to the suction inlet of a forevacuum pump 12. The outlet 13 of forevacuum pump 12 leads to the ambient air where atmospheric pressure prevails.

At the suction inlet of vacuum pump 11, a pumping speed $S_I$ and a pressure $P_I$ prevail. At this site, there is arranged a connector 14 for connection of a leak detector thereto.

At the suction inlet of forevacuum pump 12, a pumping speed $S_{II}$ and a pressure $P_{II}$ prevail. Arranged at this site is a connector 15 likewise adapted for optionally connecting the leak detector thereto.

At the outlet of forevacuum pump 12, a pressure $P_{III}$ prevails. Arranged at this site is a connector 16 likewise adapted for optionally connecting the leak detector thereto.

In FIG. 1, leak detector 20 is connected to connector 15.

Typical ranges of the parameters $Q_{He}$, V, P and S during operation of the vacuum system are the following:

$Q_{He}=10^{-7}\ldots 10^{-4}\ldots 10^{-3}\ldots 10^{-1}$ mbarl/s(Grob)

$V=[0.5l]0.5\ m^3\ldots 80\ m^3$ $P_I=10^{-2}\ldots 15$ mbar $S_I=\ldots 800\ l/s(3000\ m^3/h)$ $P_{II}=10^{-2}\ldots 0.1\ldots 45$ mbar $S_{II}=1\ldots 350\ l/s\ (1260\ m^3/h)$ $P_{III}=Atm$ In FIG. 2, the functional testing of the leak detector 20 is illustrated. The leak detector comprises a partial pressure sensor 21 configured in the same manner as described in DE 100 31 882 A1 which herewith is incorporated into the present application by reference. The partial pressure sensor comprises a detection chamber 22 having a window which is selectively permeable to helium and forms the inlet 24 of the partial pressure sensor. Internally of detection chamber 22, a pressure sensor is arranged, e.g. in the form a Penning pressure sensor as also described in DE 10 2004 034 831 A1. This sensor will communicate to an evaluation unit 25 a detection value corresponding to the helium partial pressure.

Connected to inlet 24 is an adapter 26 allowing for pressure-tight connection of a testing device 30. Here, testing device 30 consists of a syringe comprising a syringe barrel 31 and a piston 32 arranged for displacement in said syringe barrel. In front of piston 32, the chamber 33 with variable volume is arranged. By manual displacement of piston 32, the size of chamber 33 will be changed. At the front end of the syringe, the syringe cone 34 is disposed which is connected to adapter 26 in a pressure-tight manner.

Partial pressure sensor 21 will measure the helium partial pressure. The partial pressure sensor has connected to it the testing device 30, wherein the blind volume between the window 23 and the front end of the piston path should be a defined volume so that, when the volume is changed, it will be possible to generate a stable, defined pressure change.

At the sensor, there will first prevail an air pressure of 1000 mbar and a helium partial pressure of about 5E-3 mbar. When, by use of the syringe piston, one now enlarges the cylinder chamber to a known volume, while observing the scale attached to the syringe cylinder, the air pressure and the helium partial pressure at the sensor will decrease by a ratio which depends on the blind volume and the syringe volume. The syringe is used, as it were, as a "pump". By this pressure drop, the indicated leak rate of the leak detector will change. Thus, one can check the function of the leak detector and, if the helium partial pressure is known, even perform a quantitative check of the sensitivity of the leak detector.

The invention offers the following advantages:

Neither a pump nor further gases (such as e.g. nitrogen or helium) will be required.

The required measurement means are extremely inexpensive; a replacement syringe will be available at any location.

There is measured the real helium sensitivity, not some substitute value. Thus, the entire measurement path will be checked.

Also quantitative results can be obtained.

The invention claimed is:

1. A method for the functional testing of a leak detector which has a gas inlet, wherein
    a testing device comprising a chamber with variable volume is being connected to the leak detector, characterized in that the leak detector includes a partial pressure sensor which comprises a detection chamber provided with a window selectively permeable to a test gas, and a pressure sensor for providing an indication corresponding to a test partial pressure, that, through change of the size of said chamber of the testing device by increasing or reducing the volume of said chamber, with observation of a scale indicating the chamber size, the partial pressure of the test gas contained in the ambient air is changed at the gas inlet of the partial pressure sensor, and that it is checked whether the leak detector indicates the change.

2. The method according to claim 1, characterized in that the testing device is operated manually.

3. The method according to claim 1, characterized in that the testing device comprises a syringe having a syringe barrel and a piston arranged for movement in said syringe barrel.

4. The method according to claim 3, characterized in that the testing device is operated manually.

5. The method according to claim 3, characterized in that the inlet of the partial pressure sensor is being provided with an adapter allowing for pressure-tight connection of a syringe.

6. The method according to claim 3, wherein the volume of the syringe is defined by a position of the piston within the syringe barrel, wherein the volume is enlarged by retracting the piston within the syringe barrel, and conversely the volume is reduced by advancing the piston within the syringe barrel.

7. The method according to claim 6, comprising a step for reducing the partial pressure within the syringe by enlarging the volume of the syringe.

* * * * *